United States Patent
Haguel et al.

(10) Patent No.: US 11,790,110 B2
(45) Date of Patent: Oct. 17, 2023

(54) SYSTEM AND METHOD FOR PREVENTING SENSITIVE INFORMATION FROM BEING RECORDED

(71) Applicant: Nice Ltd., Ra'anana (IL)

(72) Inventors: Tal Haguel, Petach Tikva (IL); Coral Schachar, Tel Aviv (IL); Roni Krivoshey, Ramat Hasharon (IL); Michael Putter, Rishon Lezion (IL); Oleksii Hunko, Kalynivka (UA); Oren Feld, Kfar Saba (IL)

(73) Assignee: NICE LTD., Ra'anana (IL)

( * ) Notice: Subject to any disclaimer, the term of this patent is extended or adjusted under 35 U.S.C. 154(b) by 42 days.

(21) Appl. No.: 17/171,471

(22) Filed: Feb. 9, 2021

(65) Prior Publication Data
US 2022/0253551 A1  Aug. 11, 2022

(51) Int. Cl.
*G06F 21/62* (2013.01)

(52) U.S. Cl.
CPC .................................. *G06F 21/6245* (2013.01)

(58) Field of Classification Search
None
See application file for complete search history.

(56) References Cited

U.S. PATENT DOCUMENTS

| | | | |
|---|---|---|---|
| 5,481,741 A | 1/1996 | McKaskle et al. | |
| 5,881,381 A | 3/1999 | Yamashita et al. | |
| 6,226,402 B1 | 5/2001 | Katsuyama | |
| 6,327,387 B1 | 12/2001 | Naoi et al. | |
| 6,731,314 B1 | 5/2004 | Cheng et al. | |
| 6,789,054 B1 | 9/2004 | Makhlouf | |
| 7,024,456 B1 | 4/2006 | Simonoff | |
| 7,043,529 B1 | 5/2006 | Simonoff | |
| 7,366,978 B1 | 4/2008 | Jones et al. | |
| 8,117,554 B1 | 2/2012 | Grechishkin et al. | |
| 8,387,048 B1 | 2/2013 | Grechishkin et al. | |
| 8,433,714 B2 | 4/2013 | Mohan et al. | |
| 10,740,617 B2 * | 8/2020 | Varadarajan | G06V 40/174 |
| 10,838,056 B1 * | 11/2020 | Cai | G01S 13/50 |
| 2002/0002606 A1 | 1/2002 | Jaffe | |

(Continued)

FOREIGN PATENT DOCUMENTS

WO  WO-2019245680 A1 * 12/2019 ............. G06F 16/71

OTHER PUBLICATIONS

S. Porat, B. Carmeli, T. Domany, T. Drory, A. Geva and A. Tarem, "Dynamic masking of application displays using OCR technologies," in IBM Journal of Research and Development, vol. 53, No. 6, pp. 10:1-10:14, Nov. 2009, doi: 10.1147/JRD.2009.5429038 (Year: 2009).*

*Primary Examiner* — Alexander Lagor
*Assistant Examiner* — Felicia Farrow
(74) *Attorney, Agent, or Firm* — PEARL COHEN ZEDEK LATZER BARATZ LLP (57) ABSTRACT

A system and method for concealing sensitive information may include: receiving a screenshot from an application; generating an application model that identifies the application by automatically determining a respective position or location of part(s) of the screenshot; determining a part of the screenshot includes sensitive information, automatically concealing the sensitive information in the screenshot based application model to thus generate a modified screenshot, and recording the modified screenshot.

15 Claims, 6 Drawing Sheets

(56) References Cited

U.S. PATENT DOCUMENTS

| | | |
|---|---|---|
| 2004/0123238 A1 | 6/2004 | Hefetz et al. |
| 2004/0243931 A1 | 12/2004 | Stevens |
| 2005/0091576 A1 | 4/2005 | Relyea et al. |
| 2005/0276519 A1 | 12/2005 | Kitora et al. |
| 2006/0026519 A1 | 2/2006 | Vaindiner et al. |
| 2007/0271283 A1 | 11/2007 | Markya et al. |
| 2007/0277090 A1 | 11/2007 | Raja et al. |
| 2008/0021842 A1 | 1/2008 | Pintos et al. |
| 2008/0040655 A1 | 2/2008 | Tanaka |
| 2008/0163080 A1 | 7/2008 | Kooy et al. |
| 2008/0209348 A1 | 8/2008 | Grechanik et al. |
| 2009/0119578 A1 | 5/2009 | Relyea et al. |
| 2009/0313601 A1 | 12/2009 | Baird et al. |
| 2010/0246958 A1 | 9/2010 | Ma |
| 2011/0002547 A1 | 1/2011 | Enomoto |
| 2011/0088011 A1 | 4/2011 | Quali |
| 2016/0026730 A1 | 1/2016 | Hasan |
| 2016/0055393 A1* | 2/2016 | Feng .................... G06V 10/751 382/199 |
| 2016/0105328 A1 | 4/2016 | Cooper et al. |
| 2017/0116179 A1 | 4/2017 | Gagne-Langevin et al. |
| 2017/0180605 A1* | 6/2017 | Lim ................... H04N 1/00461 |
| 2018/0129545 A1 | 5/2018 | Beckett et al. |
| 2018/0176272 A1 | 6/2018 | Zur et al. |
| 2019/0075218 A1* | 3/2019 | Ribani ................ H04N 1/4446 |
| 2020/0042837 A1* | 2/2020 | Skinner ................ G06V 30/274 |
| 2020/0134774 A1* | 4/2020 | Yoon ....................... G06T 5/001 |

* cited by examiner

SYSTEM AND METHOD FOR PREVENTING SENSITIVE INFORMATION FROM BEING RECORDED

FIELD OF THE INVENTION

The present invention relates generally to recording systems. More specifically, the present invention relates to automated systems and methods for preventing sensitive information from being recorded.

BACKGROUND OF THE INVENTION

Screen recoding, the recording of information displayed on monitors or screens of computers, is known in the art. For example, installed on agents' computers in call centers, screen recorders record screens displayed on monitors of agents, and recorded screens (or sessions) are used for various purposes, e.g., training, improving service and/or investigations.

In many cases, some of the recorded screens or sessions include sensitive information, e.g., personal details, credit card numbers and the like. In order to maintain privacy of customers or clients, known systems and methods stop or avoid recording screens that include sensitive information. Other methods include manually removing recorded material that includes sensitive information.

Current and/or known systems suffer from a number of drawbacks. For example, completely stopping a recording of screens that can potentially include sensitive information may cause loss of valuable, yet non-sensitive information. For example, a screen may include a number of fields, checkboxes and the like where only some of the fields may (e.g., when filled by an agent) include sensitive information, a known system may therefore avoid recording the screen. Accordingly, even though the screen may not include sensitive information (e.g., an agent has not yet entered any sensitive information), known systems may avoid recording the screen, thus valuable information may be lost. Moreover, by avoiding recording screens as described, current systems and methods fail to record valuable, non-sensitive information, e.g., non-sensitive information in screens that are not recorded as described.

Other known methods include manually removing sensitive information from recorded screens or sessions. However, such manual processing is time consuming, costly and error prone.

SUMMARY OF THE INVENTION

In some embodiments, a method of preventing sensitive information from being recorded may include receiving, by a masking unit, an image of a region of a monitor or screen or display on a monitor, the region including information presented by an application; identifying, by the masking unit, at least one part of the region; determining whether or not the at least one part includes sensitive information; if the at least one part includes sensitive information then: concealing the sensitive information in the image to thus generate a modified image; and providing the modified image to a recorder.

A system and method may include identifying the location of the at least one part within the region based on the relative location of the at least one part within the region. A system and method may include recalculating the location of the at least one part upon detecting a change of dimensions of the region. A system and method may include identifying the at least one part is based on a title.

A system and method may include determining the at least one part contains sensitive information based on identifying presence of information in the at least one part. A system and method may include determining the at least one part contains sensitive information based on optical character recognition (OCR) applied to the least one part. A system and method may include determining the at least one part contains sensitive information based on an interaction of a user with an application.

A system and method may include changing a value of each of a set of pixels to a predefined value common to each of the set of pixels. A system and method may include selectively concealing sensitive information in at least one of a plurality of parts of the region. A system and method may include receiving a sequence of images of the region; concealing, in a first image included in the sequence, sensitive information in a first part of the region; and concealing, in a second image included in the sequence, sensitive information in a second part of the region.

A system and method may include identifying the at least one part of a region based on a distance of the at least one part from a border of the region. A system and method may include providing a screen recording in which sensitive information is concealed. Other aspects and/or advantages of the present invention are described herein.

BRIEF DESCRIPTION OF THE DRAWINGS

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not of limitation in the figures of the accompanying drawings, in which like reference numerals indicate corresponding, analogous or similar elements, and in which:

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items.

Unless explicitly stated, the method embodiments described herein are not constrained to a particular order in time or to a chronological sequence. Additionally, some of the described method elements can occur, or be performed, simultaneously, at the same point in time, or concurrently. Some of the described method elements may be skipped, or they may be repeated, during a sequence of operations of a method.

Figure 1:
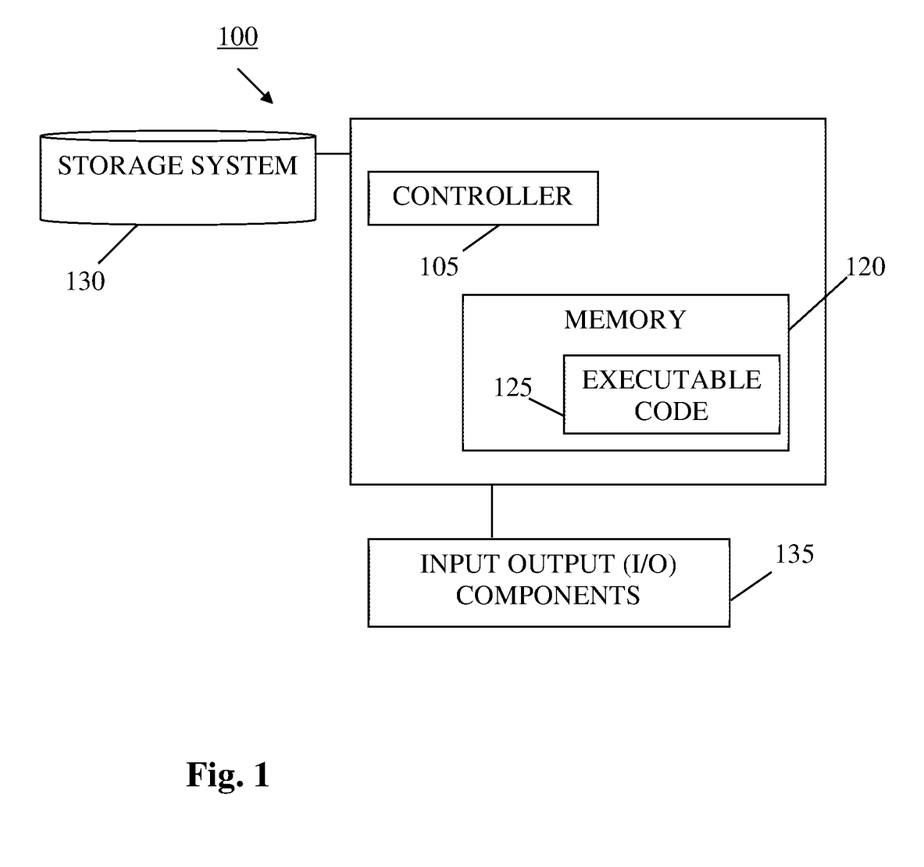
FIG. 1 shows a block diagram of a computing device according to illustrative embodiments of the present invention.

Reference is made to FIG. 1, showing a non-limiting, block diagram of a computing device or system 100 that may be used to prevent sensitive information from being recorded according to some embodiments of the present invention. Computing device 100 may include a controller 105 that may be a hardware controller. For example, computer hardware processor or hardware controller 105 may be, or may include, a central processing unit processor (CPU), a chip or any suitable computing or computational device. Computing system 100 may include a memory 120, executable code 125, a storage system 130 and input/output (I/O) components 135. Controller 105 (or one or more controllers or processors, possibly across multiple units or devices) may be configured (e.g., by executing software or code) to carry out methods described herein, and/or to execute or act as the various modules, units, etc., for example by executing software or by using dedicated circuitry. More than one computing devices 100 may be included in, and one or more computing devices 100 may be, or act as the components of, a system according to some embodiments of the invention.

Memory 120 may be a hardware memory. For example, memory 120 may be, or may include machine-readable media for storing software e.g., a Random-Access Memory (RAM), a read only memory (ROM), a memory chip, a Flash memory, a volatile and/or non-volatile memory, a cache memory, a buffer, a short term memory unit, a long term memory unit, or any other suitable memory units or storage units. Memory 120 may be or may include a plurality of, possibly different memory units. Memory 120 may be a computer or processor non-transitory readable medium, or a computer non-transitory storage medium, e.g., a RAM. Some embodiments may include a non-transitory storage medium having stored thereon instructions which when executed cause the processor to carry out methods disclosed herein.

As referred to herein, "a controller" or "a processor" carrying out a function or set of functions can include one or more such controllers or processors, possibly in different computers, doing so. Accordingly, it will be understood that any function or operation described as performed by a controller 105 may be carried by a set of two or more controllers in possibly respectively two or more computing devices. For example, in an embodiment, when the instructions stored in one or more memories 120 are executed by one or more controllers 105 they cause the one or more controllers 105 to carry out methods of preventing sensitive information from being recorded as described herein.

Figure 2:
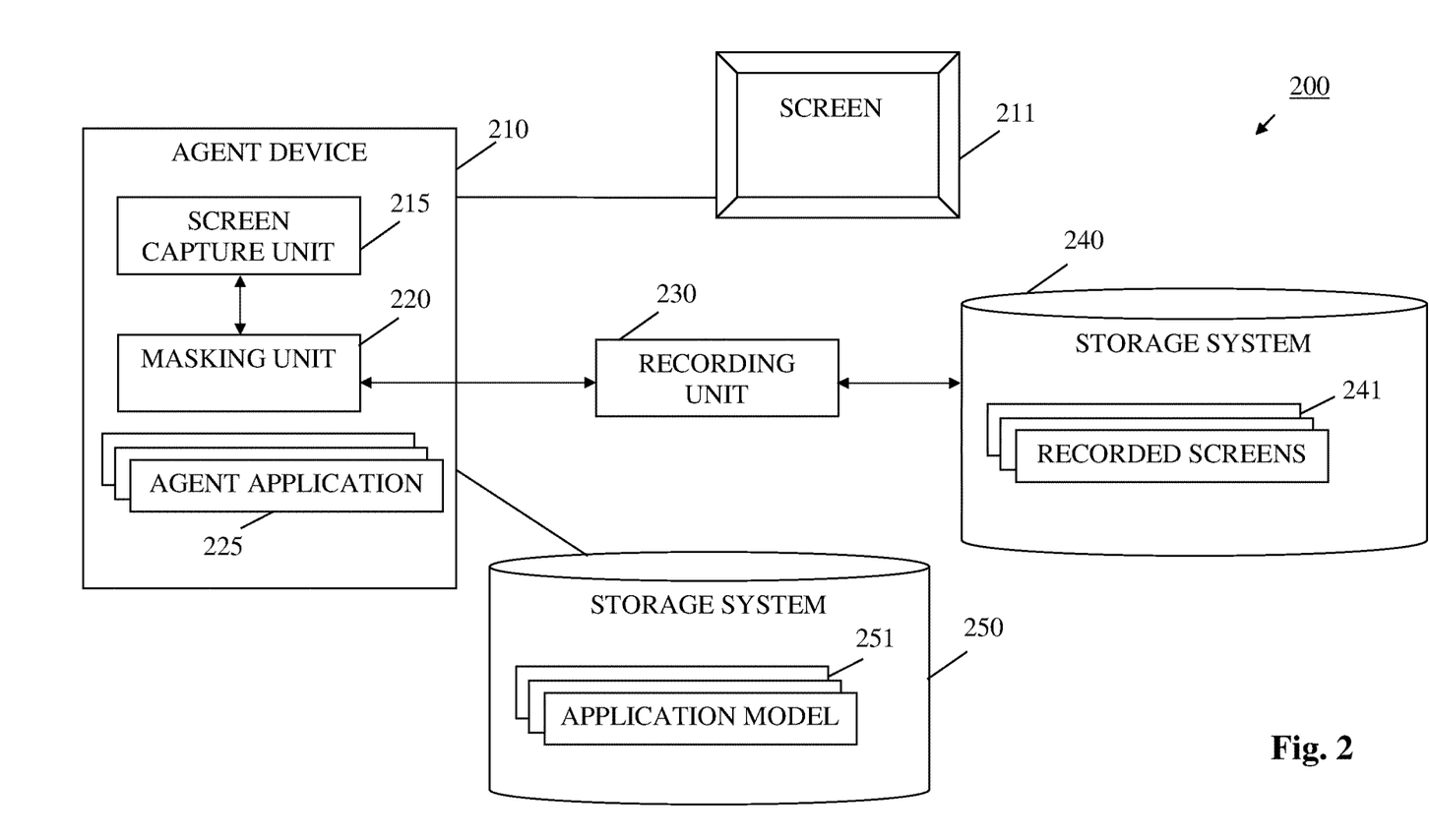
FIG. 2 is an overview of a system according to illustrative embodiments of the present invention.

More than one computing device 100 may be included, and one or more computing devices 100 may act as the various components, for example the components of system 200 such as agent device 210, recording unit 230 and storage system 240 shown in FIG. 2 and described herein may be, or may include components of, computing device 100.

Executable code 125 may be an application, a program, a process, task or script. A program, application or software as referred to herein may be any type of instructions, e.g., firmware, middleware, microcode, hardware description language etc. that, when executed by one or more hardware processors or controllers 105, cause a processing system or device (e.g., system 100) to perform the various functions described herein.

Executable code 125 may be executed by controller 105 possibly under control of an operating system. For example, executable code 125 may be an application that prevents sensitive information from being recorded as further described herein. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein. For example, units or modules described herein, for example, as further described herein, agent device 210, recording unit 230 and storage system 240, may be, or may include, controller 105, memory 120 and executable code 125.

Computing device or system 100 may include an operating system (OS) that may be code (e.g., one similar to executable code 125 described herein) designed and/or configured to perform tasks involving coordination, scheduling, arbitration, supervising, controlling or otherwise managing operation of computing device 100, for example, scheduling execution of software programs or enabling software programs or other modules or units to communicate. Operating system may be a commercial operating system. Accordingly, units included in computing device or system 100 may cooperate, work together, share information and/or otherwise communicate.

Storage system 130 may be or may include, for example, a hard disk drive, a redundant array of inexpensive disks or redundant array of independent disks (RAID), a flash memory, a CD-Recordable (CD-R) drive, a Blu-ray disk (BD), a universal serial bus (USB) device or other suitable removable and/or fixed storage unit.

Content or data may be loaded from storage system 130 into memory 120 where it may be processed by controller 105. For example, a recorded session may be loaded, from storage system 130 into memory 120 and controller 105 may generate a processed session by removing sensitive information and controller 105 may store the processed session in storage 130 and remove or delete the recorded session from storage system 130. A session or recorded session may be a set of frames or images which include images or screenshots of a screen or monitor taken over time. Accordingly, a recorded session may be played or replayed (e.g., like a video) e.g., in order to review a session or look for a specific event that occurred during the session. It will be understood that any operation performed by embodiments of the invention with respect to a captured screen or screenshot as described herein may be performed for a session or for a recorded session, e.g., by performing operations as described for some or even all of the frames, screenshots or images in a session.

I/O components 135 may be, may include, or may be used for connecting (e.g., via included ports): a mouse; a keyboard; a touch screen or pad or any suitable input device. I/O components may include one or more screens, touchscreens, displays or monitors, speakers and/or any other suitable output devices. Any applicable I/O components may be connected to computing device 100 as shown by I/O components 135, for example, a wired or wireless network interface card (NIC), a universal serial bus (USB) device or an external hard drive may be included in I/O components 135.

A system according to some embodiments of the invention may include components such as, but not limited to, a plurality of central processing units (CPU) or any other suitable multi-purpose or specific processors, controllers, microprocessors, microcontrollers, field programmable gate arrays (FPGAs), programmable logic devices (PLDs) or application-specific integrated circuits (ASIC). A system according to some embodiments of the invention may include a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device.

Reference is made to FIG. 2, an overview of a system 200 and flows according to some embodiments of the present invention. As shown, system 200 may include an agent device 210 which may include a screen capturing unit (SCU) 215 and a masking unit (MU) 220 and may further include, or be connected to, a screen 211 and a storage system 250 which may include application models 251. As further shown, agent device may include one or more agent applications 225 that may be a set of applications adapted to enable a user to provide a respective set of services. In some embodiments, executable code 125 of an application 225 may be stored in storage system 250 and in order to execute the application 225 the executable code may be loaded into a memory 120, and executed by a controller 105, in agent device 210.

As further shown, system 200 may include a recording unit (RU) 230 and a storage system 240. In some embodiments, SCU 215 may continuously or iteratively capture screens, which may be images, information or displays which are displayed on a monitor or screen of a computer. A screen may be the entire display or a portion of the display. For example, SCU 215 may continuously, iteratively or based on an event, capture content presented on screen 211 and provide the captured content to MU 220. MU 220 may examine and/or process content (e.g. captured screens) received from SCU 215, may remove, conceal or mask sensitive information therefrom and may further provide processed content to RU 230. Generally, sensitive information may be any information that may jeopardize or breach privacy. Sensitive information may be defined by a user, for example, a user may decide that a credit card number is sensitive information or that an address or telephone number is sensitive information. Some embodiments of the invention identify or mark elements in a screen (or screenshot) as including sensitive information. For example, based on input from a user, metadata in an application model 251 may include an indication or identification of elements as potentially including sensitive information. In some embodiments, sensitive information may be identified, marked and/or masked based on conventions, protocols and the like, e.g., sensitive information may be defined in order to comply with the payment card industry (PCI) convention or rules. Non-sensitive information may be, for example, an address, name or information that can easily or readily be obtained, e.g., from the Internet or from an authority.

For example, content provided by MU 220 to RU 230 may include screen captures (e.g. data describing captured screens) in which sensitive information is concealed, masked, deleted, removed or hidden. RU 230 may store content received from MU 220 in storage system 240, e.g., as shown by recorded screens 241. Components of system 200 may include components such as those shown in FIG. 1, e.g., agent device 210, SCU 215, MU 220 and storage system 240 may each be or include components such as a memory 120, controller 105 and executable code 125. As further described herein, system 200 may automatically identify sensitive information in captured screens, mask, conceal, hide or delete the sensitive information and store or record captured screens such that the recorded captured screens do not include the sensitive information. The terms and phrases "screenshot", "screen capture", "snapshot", "captured screen" and "image" as used herein may relate to any digital information that represents information or content presented on a screen, e.g., a digital representation of content presented on screen 211. For example, a screenshot may be a digital image or any array of pixel values usable for producing and/or presenting content on a screen. Merely for simplicity purposes, one of recorded screens 241 may be referred to hereinafter as a recorded screen 241. A recorded screen 241 may be, or may include, one or more screenshots or images of a screen, for example, a recorded screen 241 may include a (possibly very large) number of screenshots, e.g., taken one second apart (one per second). A recorded screen 241 may include screenshots as captured by SCU 215 or it may include screenshots produced by MU 220, for example, a recorded screen 241 may include screenshots in which sensitive information is masked, concealed or simply does not exist.

Storage systems 240 and 250 may be similar to, or include components of, storage system 130 and may include or store digital objects. For example, recorded screens 241 and application models 251 may be any suitable digital data structure or construct, or computer data objects. For example, recorded screens 241 and application models 251 may be files, may include tables or they may be objects in databases in storage systems 240 and 250. Merely for simplicity purposes, one of application models 251 or one of recorded screens 241 may be respectively referred to hereinafter as an application model 251 and a recorded screen 241.

Merely for simplicity purposes, one of recorded screens 241 may be referred to hereinafter as a recorded screen 241. A recorded screen 241 may be, or may include, one or more screenshots or images of a screen, for example, a recorded screen 241 may include a (possibly very large) number of screenshots, e.g., taken one second apart (one per second). A recorded screen 241 may include screenshots as captured by SCU 215 or it may include screenshots produced by MU 220, for example, a recorded screen 241 may include screenshots in which sensitive information is masked, concealed or simply does not exist.

An application model 251 may include information or data used by MU 220 in order to prevent sensitive information from being recorded, e.g., by masking a portion of a captured screen. For example, an application model 251 may include text or labels which are related to sensitive information and/or an application model 251 may include locations of elements within a captured screen.

Figure 3:
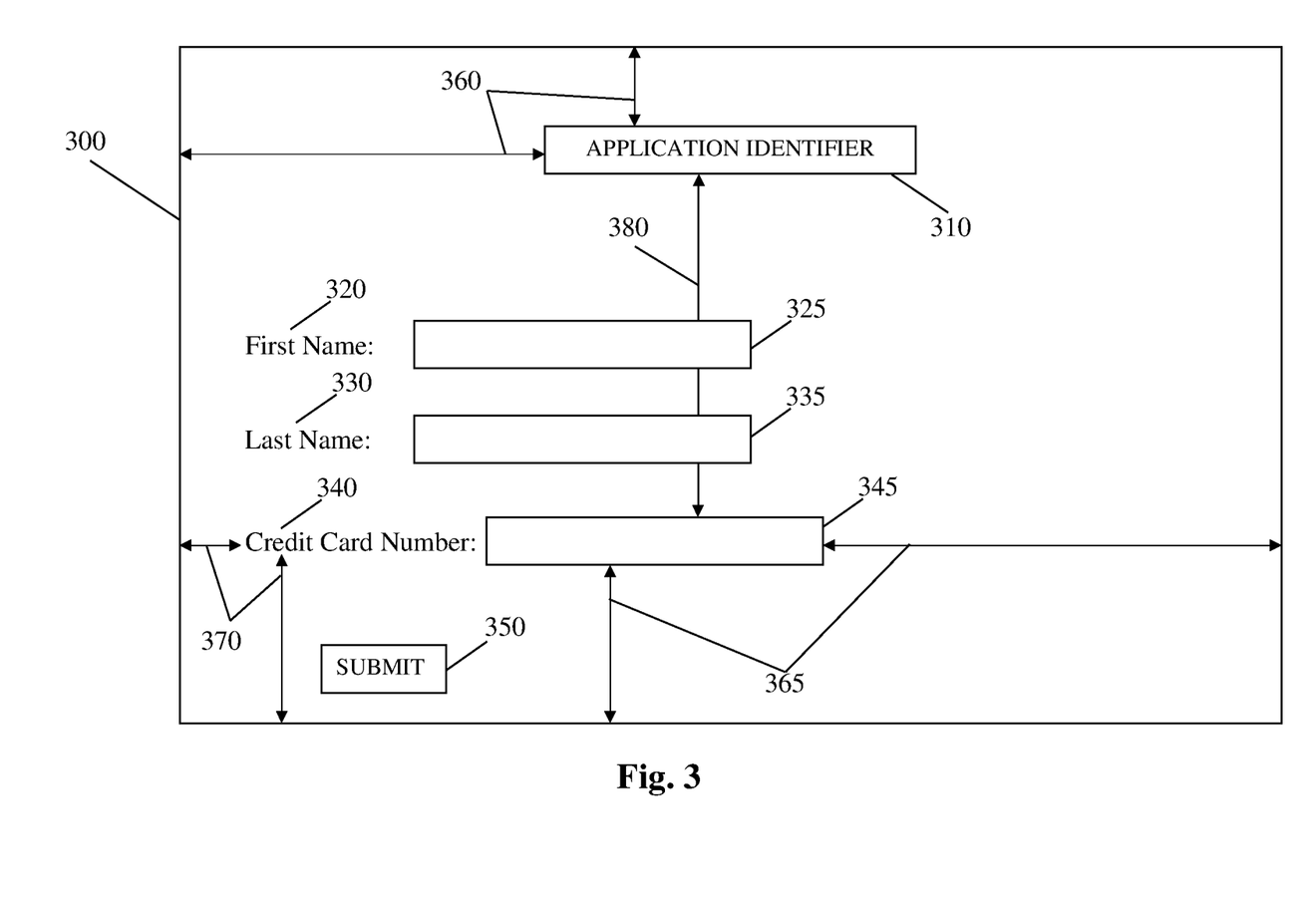
FIG. 3 shows a captured screen according to illustrative embodiments of the present invention.

Reference is made to FIG. 3 which shows a captured screen 300. Generally, a captured screen may be, or it may be represented by, an array of pixel values, e.g., in a file or in a segment of a memory 120. For example, captured screen 300 may be generated by SCU 215 by copying or duplicating the pixel values of some or even al of the pixels of screen 211, accordingly, captured screen 300 may be a snapshot or a screen capture of screen 211 produced by SCU 215. As shown, captured screen 300 may include an application identifier 310, a number of titles 320, 330 and 340 and a respective number of text entry fields or boxes 325, 335 and 345. An application identifier (e.g., application identifier 310) may be any object or element that uniquely identifies an application or otherwise enables associating a portion of a screen with an application. For example, application identifier 310 may be the name of an application or it may be a logo, where the name or logo is unique within a system. Titles 320, 330 and 340 may be descriptions of fields as exemplified by "First name", fields or boxes 325, 335 and 345 may be elements or graphical user interface (GUI) objects that enable entering information, e.g., free or other text may be entered (e.g., by an agent) in boxes 325, 335 and 345 or elements 325, 335 and 345 may be pulldown menus enabling a selection of information and so on.

Various other elements or graphical user interface (GUI) objects may be included in captured screen 300, e.g., a submit button 350 as shown, for clarity and simplicity, the number of elements shown in screen 300 is kept low, however it will be understood that any number of elements may be included in a captured screen including windows of, or portions related to, a number of different applications.

Generating an application model 251 may be done during a training or learning phase or stage. In some embodiments, generating an application model 251 may be automated. For example, computing device 100 may automatically generate an application model 251. For example, computing device 100 may be provided with screen capture 300 as input. Additional input that may be provided may be an application identifier and one or more identifiers of sensitive information. For example, application identifier 310 may be the name of the application that presents screen 300 or it may be a logo of such application. An identifier of sensitive information may be a title, for example, the text identifiers of sensitive information may be provided, by a user, as an identifier of sensitive information.

An automated process of generating an application model 251 may include automatically identifying elements in a captured screen and further determining their respective position or location within the captured screen. For example, computing device 100 may automatically identify titles 320, 330 and 340, boxes 325, 335 and 345, application identifier 310 and button 350 in screen 300 and may further determine and record (in an application model 251) distances from the borders of captured screen 300. For example, the distances 360 of application identifier 310 from the top and right sides may be recorded, or the distances 370 of the "Credit Card Number" title 340 from edges of screen 300 or the distances 365 of the text box 345 may be identified as illustrated and recorded in an application model 251. Calculated distances may be stored in an application model 251, for example, distance 380 from application identifier 310 to box 345 may be calculated and recorded, e.g., in order to speedup the process of locating box 345 which may be indicated as including sensitive information.

In some embodiments, generating an application model 251 may include converting an input image of a screen (a screenshot or a captured screen) to a black and white (B&W) image. Such conversion may greatly simplify the process of identifying and characterizing elements in a screen as further described, e.g., since an image including only two colors (e.g., black and white represented by zero ("0") and one ("1")) is relatively simple to process and thus efficiency is increased and processing of screenshots in real time is enabled.

In some embodiments, generating an application model 251 may include grouping information in a screen. For example, grouping of a set of pixels based in similar or same color, hue or other attributes. Any system or method for grouping elements in a screenshot may be used without departing from the scope of the invention, for example, grouping of pixels to thus identify elements or regions such as "First Name" 320 or box 335 may be done by, or may include, identifying, in screenshot 300, a group of pixels having the same color, the same number (or amount) of bits used for representing pixels or any other pixel attributes. For example, a border of box 345 may be identified and having identified the border, an embodiment may group the set of pixels included in, or confined by the border and the group may be associated (or it may define) an element, e.g., the box 345 element.

Computing device 100 may be used to identify and characterize elements such as titles 320, 330 and 340, boxes 325, 335 and 345, application identifier 310 and button 350. For example, based on grouping a set of pixels, an element (e.g., title 340 or application identifier 310) may be identified.

Having identified an element, e.g., by grouping pixels as described, an embodiment may record its position and orientation, e.g., by determining and recording distances 370. A distance as referred to herein may be measured or quantified using pixels, e.g., a distance may be the number of pixels from an edge of an element to an edge of a screen or window. In some embodiments, generating an application model 251 may include marking elements to be masked. For example, an embodiment may (e.g., using optical character recognition (OCR) techniques) identify a string (or key) provided by a user, e.g., a string identifying sensitive information. For example, having identified elements or groups, an embodiment may search for a specific text string in the identified groups or elements, e.g., using OCR as known in the art. It will be understood that any system, method or technique may be used in order to identify, describe and/or characterize elements in a screen during training and/or at run time, that is, any image processing system, technique or method may be used by embodiments of the invention for identifying elements such as box 335, title 320, button 350 and application identifier 310 as well as for characterizing or describing elements, e.g., identify and record an element's shape, size, location within screen 300 and the like.

For example, provided with "Credit Card Number" as a string, key or title that identifies sensitive information (e.g., as input from a user), and provided with screenshot 300, computing device 100 may group regions in screenshot 300, identify (e.g., using OCR as described) that one of the groups includes title 340 which matches the input key, string or value, and may thus determine that text box 345 may include sensitive information, e.g., since text box 345 is placed near, and at the same height of, title 340. Accordingly, remaining with the "Credit Card Number" example, computing device 100 may mark text box 345 as an element, or as including information, that needs to be masked at runtime, such that information entered into box 345 is masked or removed before a screenshot or screen capture is provided to RU 230 (which may store it in the form of a recorded screen 241), thus ensuring sensitive information is not recorded. For example, marking an element to be masked may include, or be done by, including metadata in an application model 251, for example, metadata in an application model 251 may include an application identifier (e.g., a title or name of an application as described), characteristics (e.g., shape, size and location) and/or description of an element as well as an indication that information related to the element is sensitive and/or is to be masked in a recording of a screen including the element.

Although identifying elements by grouping similar pixels is described herein it will be understood that any method of identifying or characterizing elements in an image, screenshot or screen capture may be used without departing from the scope of the invention. Any information may be included in an application model 251. For example, the size of boxes (e.g., the size of box 345), an orientation of boxes or elements and the like may be recorded.

Figure 4:
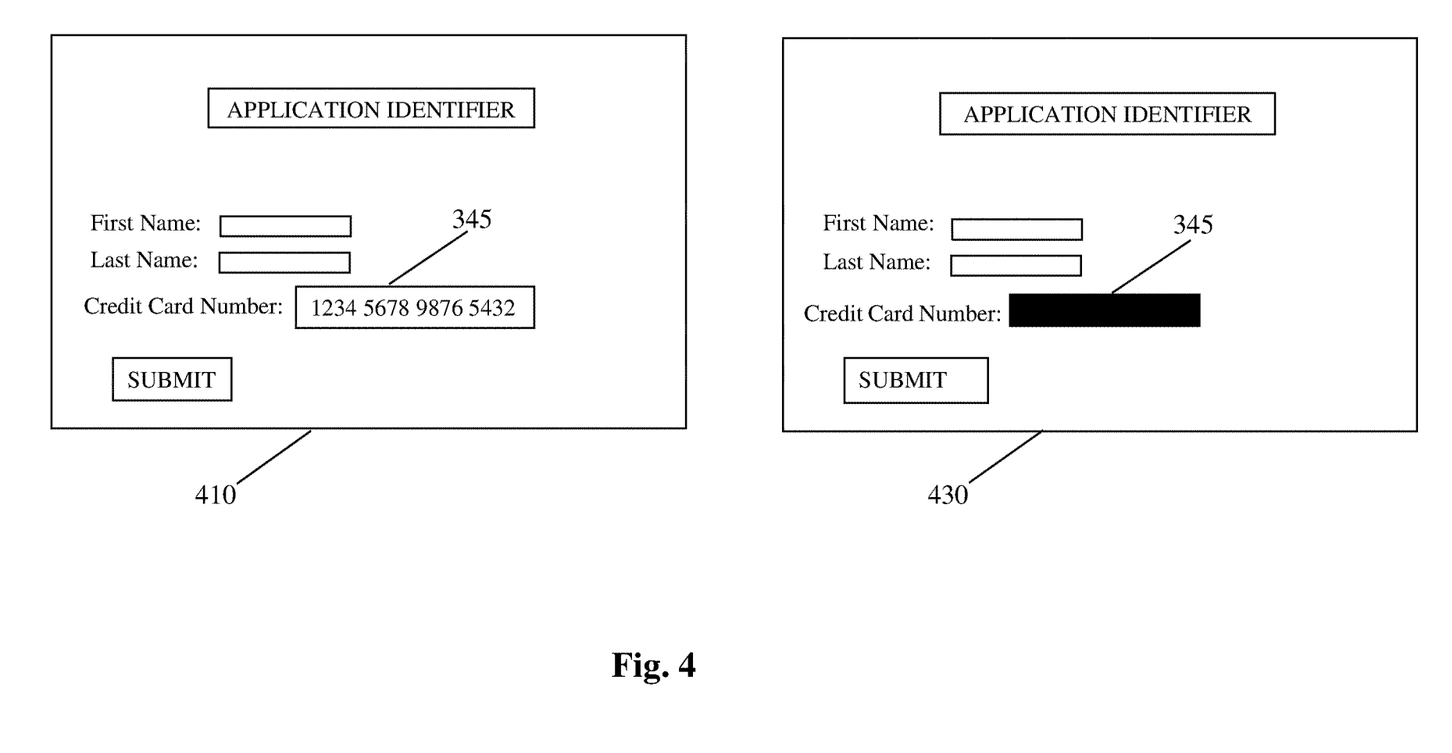
FIG. 4 shows a captured and processed screens according to illustrative embodiments of the present invention.

Reference is additionally made to FIG. 4 showing captured screenshot 410 and processed screenshot 430 according to some embodiments of the invention. For example, captured screen 410 may be provided to MU 220 by SCU 215 and may be a true image of screen 211. As SCU 215 may capture screens while a user (e.g., an agent) is interacting with an application, sensitive information such as credit card number may be included in captured screen 410, e.g., the "1234 5678 9876 5432" credit card number may be captured as shown by captured screen 410. As shown by processed screen 430 and as described, an embodiment may automatically identify and mask the information in box 345 such that the credit number is hidden and send processed screen 430 to RU 230 which may store processed screen 430 in storage system 240. Accordingly, instead of sending screenshot 410 to RU 230 (e.g., as known systems or methods would) or simply avoiding a recording of captured or screenshot 410 (e.g., as other known systems or methods would), an embodiment may send processed screenshot 430 to RU 230 thus preventing sensitive information from being recorded while recording all other information in a captured screen 410.

It will be understood that although, for the sake of clarity and simplicity, masking a single element (the "Credit Card Number") is described herein, any number of elements may similarly be masked by embodiments of the invention. For example, metadata in an application model 251 may indicate, characterize and describe any number of elements in a screen that are to be masked and accordingly, embodiments of the invention may mask any number of elements in a screen as described with reference to element 345. For example, some information in an application model 251 may be formatted according to the JavaScript Object Notation (JSON), a standard text-based format for representing structured data, and may include descriptions of elements in a window of an application, e.g., one or more JSON elements may describe or include distances of an element (e.g., box 345) from borders of the window or from other elements in the window (e.g., distance of box 345 from application identifier 310), an indication of whether or not an element may include sensitive information and so on. As described, an embodiment may include a plurality of application models 251 each describing elements in a respective plurality of applications.

Generally, when executed, an application 225 opens or displays a window or region on screen 211. A window or region of an application may be, or it may cover or occupy the entire presentation area of screen 211, e.g., in full screen as known in the art, or a region or window of an application may be resized and moved such that it only occupies a specific portion of screen 211.

Figure 5:
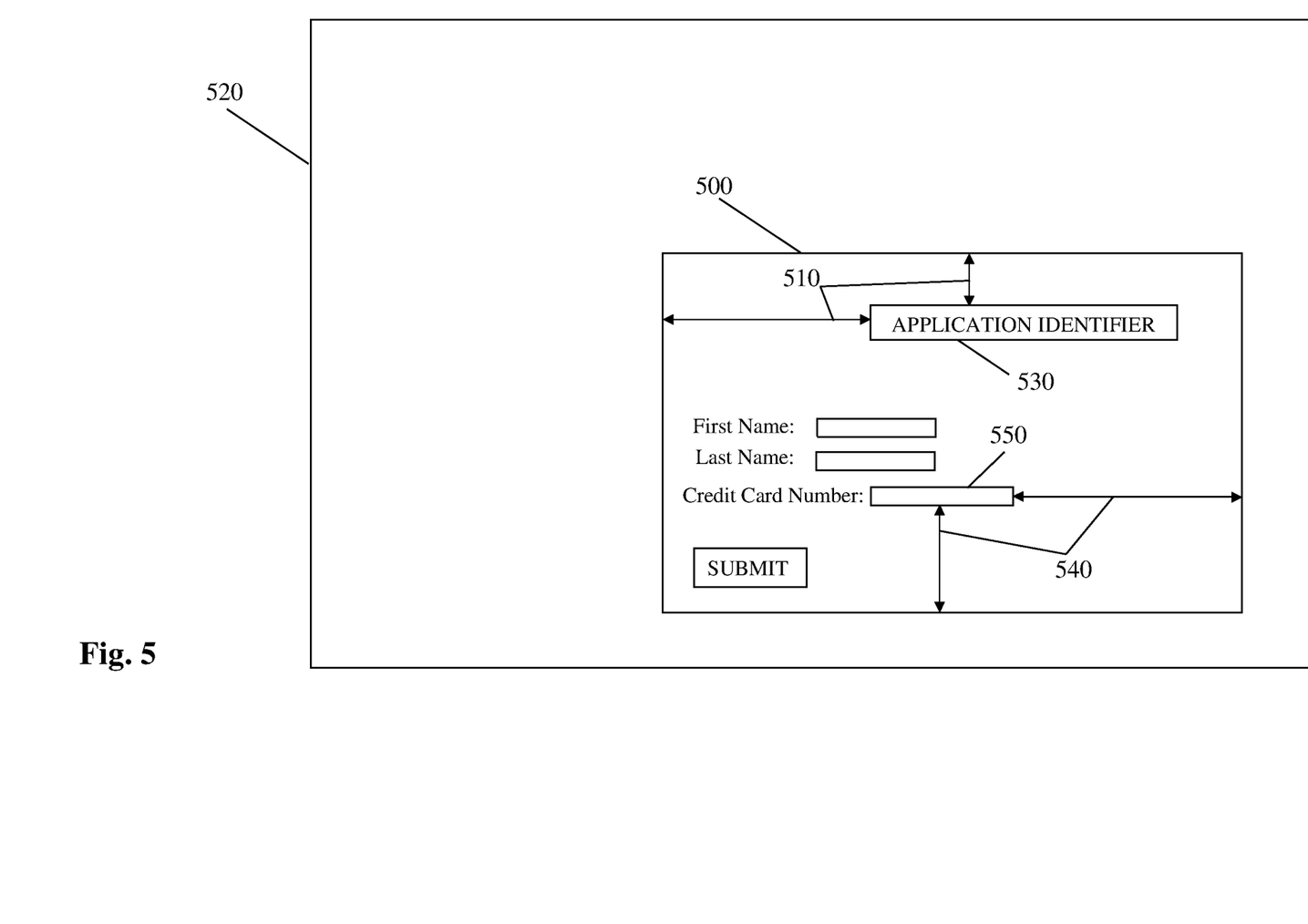
FIG. 5 shows screen windows according to illustrative embodiments of the present invention.

Reference is made to FIG. 5 which shows a screenshot 520 including a window 500 according to illustrative embodiments of the present invention. For example, during a first time period, region or window as illustrated by screenshot 300 may occupy or cover the entire presentation area of screen 211, e.g., screenshot 300 is produced by SCU 215 when the application identified by application identifier 310 is in full screen mode and displayed in a maximum allowed area of a monitor. During a second time period, the application may occupy a smaller window as illustrated by window or region 500, which is the window or region of the application identified by application identifier 310 after it was shrunk, resized and/or moved around on screen 211, when the application is displayed in a smaller portion of the monitor. Of course, other windows or elements may be included in screenshot 520, these are omitted for clarity.

In some embodiments, when MU 220 receives a screenshot, MU 220 also receives, e.g., from SCU 215 or from an operating system (OS) on agent device 210, one or more identifications of applications that are presenting information on screen 211. For example, an identification of an application may be a text string which is the name of the application. For example, MU may receive, with or in association with a screenshot, the names of the applications that have opened windows on screen 211. For the sake of simplicity, an identification of an application will be referred to herein as a title of an application or simply title, for example, MU 220 may receive one or more titles with, or in association with a screenshot.

In some embodiments, MU 220 uses a received title in order to find an application model 251, for example, a hash function of (applied to) the title may be used as a search key in a list or database of application models 251. In some embodiments, e.g., if a title is not provided with a screenshot, MU 220 may search for titles in the screenshot (e.g., using grouping and OCR as described) and, if titles are found then MU 220 may use them to retrieve application models 251 as described.

Using an application model, MU 220 may identify and determine the location of a title. For example, provided with screenshot 300 and possibly using distances 360 included the application model 251, MU 220 may determine application identifier 310 is the correct title (e.g., the text in application identifier 310 is same as the title in the application model 251. Using other metadata in the application model 251, e.g., distances 380, 370 and 365 and/or other description of box 345 (e.g., shape, size etc.), MU 220 may determine the exact are that may include sensitive information and therefore may need to be masked.

In some embodiments, e.g., to increase speed and reduce resources, if MU determines an area, region or portion that may include sensitive information then MU 220 may mask the area, e.g., set the values of pixels in the area to a predefined value (e.g., so they are all black as illustrated by box 345 in screenshot 430).

In some embodiments, if MU determines an area, region or portion that may include sensitive information then MU 220 may examine the area (e.g., using OCR as described). For example, although box 345 was identified as potentially including sensitive information, MMU 220 may check whether or not sensitive information is included in box 345. For example, if MMU 220 identifies (e.g., using OCR) that nothing was entered in box 345 then MMU selects to leave box 345 unmasked.

In some embodiments, if MU determines an area, region or portion that may include sensitive information includes at least some information then MU 220 may apply a rule or criteria in order to select whether or not to mask the region. For example, examining box 345 MU 220 may identify that box 345 is not empty, e.g., at least one digit of a credit card number was entered by a user or agent. If MU 220 determines box 345 is not empty then MU 220 may check or determine the number of digits included in box 345 compare or relate the number to a threshold. If the number of digits found in box 345 is above or greater than a threshold, e.g., five, then MU 220 may select to mask box 345, however, if the number of digits in box 345 is lower than the threshold then MU 220 may select to leave box 345 unmasked. Various other rules or criteria may be used in order to select whether or not to mask a region, e.g., the first four digits found by MU 220 in box 345 may be compared to a set of known or valid first four digits, accordingly, if MU 220 identifies box 345 includes an invalid card number then MU 220 may select to leave box 345 unmasked, e.g., since recording the invalid card number does not reveal any sensitive number and, moreover, errors can be identified, e.g., by replaying a recorded session it is easy to see where and when a mistake (of entering an invalid card number) was made. In another example, a rule may indicate the type of content expected in an element. For example, detecting that box 345 includes characters but, based on a rule, expecting digits in box 345, MU 220 may select to leave box 345 unmasked thus enabling to record (and later see) a mistake while not reveling any sensitive information. Rules as described may be included in an application model 251. For example, a rule may be associated with an element, e.g., with box 345 as described or it may be global, that is, applied to all, or a subset of elements in a screenshot.

If MMU 220 does not find a title where, per information in the application model 251, a title is expected, then MMU 220 may search for the title in a received screenshot. For example, if MMU 220 receives screenshot 520 then it will not find a matching title at the location of application identifier 310 in screenshot 300. Searching for a title may be done as described, e.g., by grouping pixels or elements on a screenshot and/or applying OCR. If MMU 220 finds a matching title, e.g., finds application identifier 530 and determines it includes the title in the corresponding application model 251 then MMU 220 may determine the location of application identifier 530 within window 500, e.g., MMU may calculate or determine distances 510. Based on the location of an application identifier (e.g., 530) in a window 500, MMU 220 may determine a location of any other element in the window. For example, by relating distances 510 to distances 360, a ratio may be derived and, accordingly, distances 540 may be readily determined. Similarly, a ratio may be used to determine the size of box 550 in window 500 (which is a resized version of box 345 in the full-screen window or screenshot 300). Any operations as described herein, e.g., masking, may be performed on elements in a window. For example, remaining with the credit card example, MMU 220 may mask box 550.

Generally, a user (e.g., an agent in a call center) operating agent device 210 may use several different applications, e.g., for providing a respective set of different services to customers. Accordingly, at a given time, several windows or regions may be presented (or opened) on screen 211 and an agent may use, or interact with, a first window or region (of a first application 225) during a first time period, and use, or interact with, a second window or region (of a second, different application 225) during a second time period.

Embodiments of the invention may concurrently conceal, mask or hide sensitive information in a plurality of windows or regions in a screenshot. For example, screenshot 520 may include first and second windows or regions, e.g., window 500 and another or additional window (not shown) and MU 220 may process the additional window as described with reference to window 500. For example, MU 220 may receive, with screenshot 520, first and second titles, may (based on the titles as described) retrieve respective first and second application models 251 and use the application models 251 to mask, as described, elements in the first and second windows or regions in a single, same screenshot.

Figure 6:
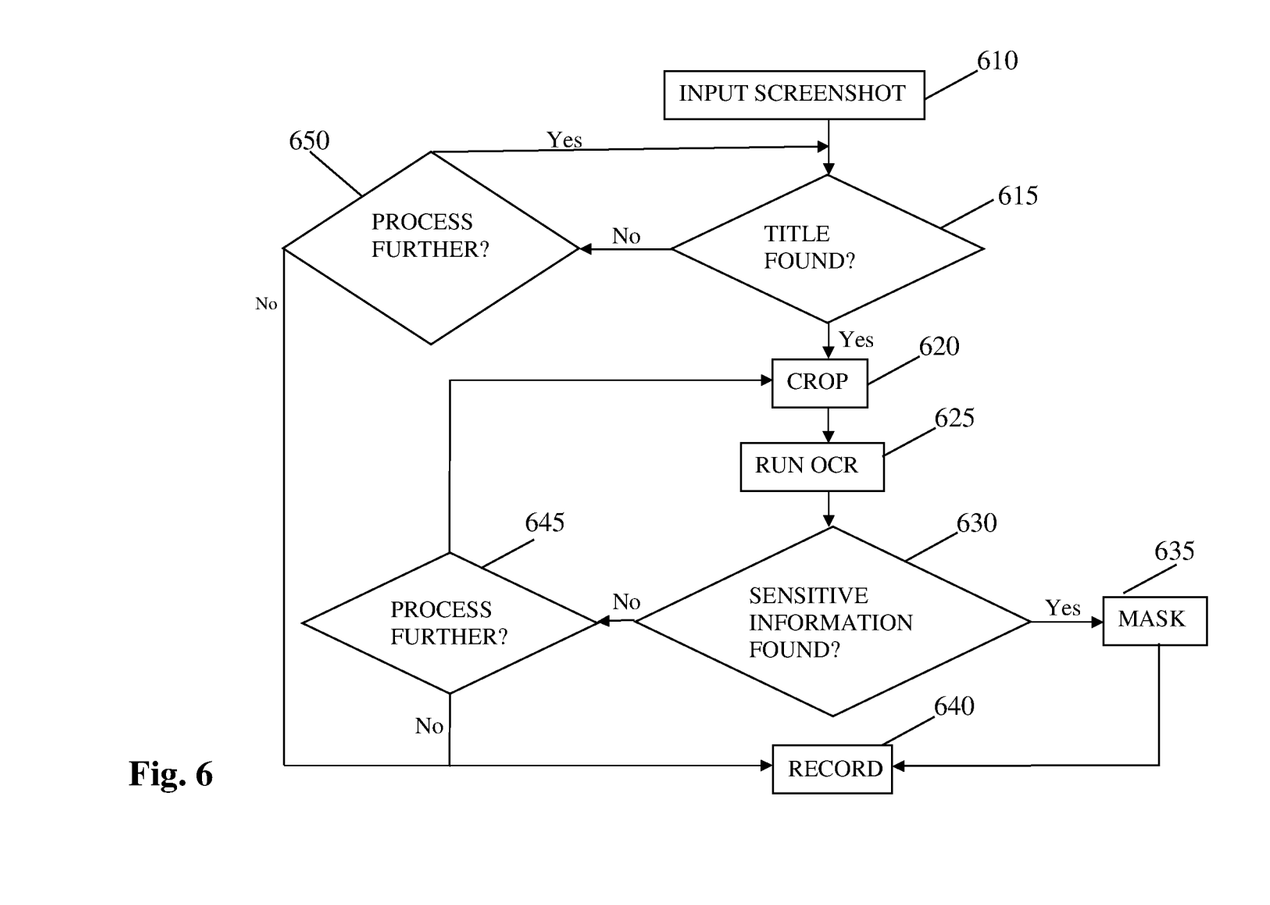
FIG. 6 shows a flowchart of a method according to illustrative embodiments of the present invention.

Reference is made to FIG. 6 which shows a flowchart of a method according to illustrative embodiments of the present invention. As shown by input screenshot 610, an input screenshot may be received, for example, MU 220 may receive a screenshot, image or frame 520 from SCU 215.

As shown by block 615, an embodiment may search for a title in the input image. For example, MU 220 may use a title received with an input screenshot, retrieve an application model 251 and, based on distances recorded in the application model 251, determine whether or not a matching title is included in the input frame. For example, MU may apply OCR 625 to the part including application identifier 310 and compare resulting text to the title received with the input screenshot.

As shown by block 620, if a title is found then some embodiments may crop a portion or part of the input screenshot. Cropping a part or portion of an image or screenshot may be, or may include, copying, duplicating, or otherwise obtaining a subset of pixel values or attributes from the set of pixels values that digitally are, or represent, a screenshot. For example, MU 220 may crop window 500 from screenshot 520 by copying from screenshot 520 to a memory 120, the pixel values of the pixels included in, or representing window 500. Otherwise described and as known in the art, cropping may include removing from an image all but a cropped area, part or region in the image. As described, by cropping selected parts of a screenshot, embodiments of the invention may process only selected parts of the screenshot.

As shown by block 630, some embodiments may check whether or not sensitive information is present in an area or region. For example, embodiments of the invention may determine whether or not text produced by applying OCR to a part of a screenshot is, or includes, sensitive information. For example, and as described, rules applied to an output of an OCR application may be used to determine whether or not sensitive information is present in a screenshot.

As shown by block 635, if sensitive information is found, some embodiments may mask or conceal the information in the screenshot, e.g., as illustrated by screenshot 430. As shown by block 640, some embodiments may record a processed screenshot, e.g., a screenshot in which sensitive information is masked or concealed. For example, MU 220 may mask information in an input screenshot to thus produce a processed or modified screenshot and MU 200 may send the processed or modified screenshot to RU 230 which may store or record the processed or modified screenshot in storage system 240.

As shown by block 645, if, although sensitive information was not found and embodiments determines that no further processing is required then an embodiment may send the screenshot to RU 230 which may store or record the screenshot in storage system 240. For example, MU 220 may determine that no information (e.g., digits) was entered into box 345 and accordingly, e.g., since based on the relevant application model 251, no other elements in the screenshot need to be examined, the screenshot can be safely stored. As further shown, if further processing is required then an embodiment may crop another or same part and repeat some of the steps of the flow or method. For example, after cropping and processing (e.g., masking) a first part of a screenshot, MU 220 may check the relevant application model 251 to see if additional parts need to be cropped and processed. For example, in the case credit cards number and family name in screenshot 410 are considered or defined as sensitive, MU 220 may crop and mask box 335 and then crop and mask box 345. If sensitive information is not found then, as shown by block 645 some embodiments may determine that further processing may be required, e.g., other portions of the screenshot may need to be cropped in order to find the sensitive information. Further processing may be or may include a verification step, e.g., if sensitive information is not found where expected, an embodiment may re-crop a part or portion of an image or screenshot and attempt to identify sensitive information in the re-cropped part. In some embodiments, further processing may include re-calculating distances and dimensions. For example, if sensitive information is not found where expected (e.g., based on information in an application model 251 as described) then an embodiment may search for another or additional window in a screenshot and may check whether a title received as described is included in the additional window. Further processing may include alerting. For example, if a title is received by MU 220 as described but MU 220 fails to identify the title in a screenshot then MU 220 may alert a user, e.g., by sending an error message to a preconfigured list of recipients.

As shown by block 650, if a title is not found, some embodiments may determine whether or not further processing is needed. For example, if a title is not found where expected based on an application model 251 (which may have been produced based on full-screen as described) then an embodiment may further process an input screenshot by searching for the title in other locations in the screenshot. For example, MU 220 may (e.g., using grouping or otherwise) identify windows in a screenshot (windows like window 500) and MU 220 may search for the title in the identified windows as described. Otherwise described, some embodiments may search for a title in a screenshot starting with a location indicated in a model and, if the title is not found, proceeding to searching the title in identified windows or regions of the screenshot.

In some embodiments, a method of preventing sensitive information from being recorded may include receiving, for example by a masking unit, an image of a region of or displayed on a computer monitor, the region including information presented or generated by a computer application such as an agent computer application; identifying, by the masking unit, at least one part of the region; determining whether or not the at least one part includes sensitive information; if the at least one part includes sensitive information then: concealing the sensitive information in the image to thus generate a modified image; and providing the modified image to a recorder. While specific hardware or modules, are described, in other embodiments other units or hardware may be used. For example, a masking unit need not receive and identify a part of the region.

For example, MU 220 may receive an image (or screenshot, e.g., screenshot 520 or 300) including information presented by computer application such as an agent application 225, identify a region in the screenshot (e.g., window 520), identify a part of the region (e.g., box 345), determine whether or not the identified part includes sensitive information (e.g., determine whether or not box 345 includes sensitive information as described). As described, if MU 220 determines that the identified part indeed includes sensitive information then MU 220 may conceal the sensitive information to thus generate a modified image (e.g., as illustrated by screenshot 430). As described, a modified or processed screenshot may be provided to a recorder, e.g., to RU 230 that may record the processed screenshot in storage system 240. If MU 220 determines that the identified part does not include sensitive information then MU 220 may leave the part unmasked. While an agent application is provided as an example of a computer program providing visual data, any application or program may be used in various embodiments. Similarly, while an agent device 210 is described, any suitable computing device may be applicable.

In some embodiments, identifying a location a part or element within a region or window may be based on a relative location of the part within the region or window. For example and as described, the location of box 345 in window 300 may be identified using distances 365 which are relative to the borders of a region or window in screenshot 300. Similarly, the location of box 550 may be determined based on distances 540 which are relative to the borders of window 500.

In some embodiments, a location of a part or element of a window or region may be calculated or recalculated upon detecting a change of location and/or dimensions of a window or region including the part or element. For example, having identified (or being informed, e.g., by SCU 215 or by an OS) that presentation of an application 225 was changed from full screen (e.g., as illustrated by screenshot 300) to a different aspect ratio, e.g., to a smaller window 500 as described, MU 220 may calculate (or recalculate) the location of box 550. Any system or method may be used in order to detect a change in size or location of a window of an application, e.g., SCU 215 may inform a location and size of a window or a hook in an OS may alert MU 220 of a change of a window.

In some embodiments, identifying or detecting a part or element may be based on a title of an application. For example and as described, MU 220 may identify box 345 based on matching a title (e.g., received from SCU 215) with application identifier 310 or based on matching a title with application identifier 530 as described.

In some embodiments, determining a part or element in a window or screenshot contains sensitive information may be based on identifying the presence of information in the part or element. For example and as described, MU 220 may identify that information is indeed included or present in box 345 and may further determine whether or not the information therein is sensitive.

In some embodiments, determining a part or element contains sensitive information may be based on applying OCR to the part or element. For example, MU 220 may apply or use OCR in order to determine whether box 345 contains entered information or box 345 is empty as described.

In some embodiments, determining a part or element contains sensitive information may be based on an interaction of a user with an application. For example, MU 220 may receive, e.g., from an OS on agent device 210, an indication that a user clicked box 345 or MU may receive an indication that window 500 is in focus or is the upper or front window. In some embodiments, if focus is on 500 or if box 345 was clicked then MU 220 may process screenshot as described. However, if MU 220 determines that window 500 is not in focused or the box 345 was not clicked or interacted with then MU 220 may skip processing window 500. Accordingly, some embodiments may increase efficiency and speed or processing screenshots by avoiding processing of regions or windows where no sensitive information is present.

In some embodiments, concealing sensitive information may include changing a value of each of a set of pixels to a predefined value common to each of the set of pixels. For example, to mask box 345 MU 220 may set the values of all pixels in, or of, box 345 to black (e.g., zero) such that no valuable or meaningful information exists in, or can be obtained from, box 345 in a recorded screen 241.

Some embodiments may selectively conceal sensitive information in at least one of a plurality of parts of the region. For example, in addition to concealing information in box 345 as described, MU 220 may conceal information in box 335, e.g., if a user decides that a last name is sensitive information. For example, e.g., in a training or learning phase as described, a user may indicate that the last name 330 is sensitive information and consequently MU 220 may process box 335 as described with respect to box 345. In another example, MU 220 may mask two different elements in two different windows (e.g., of the same or of different applications 225 as described).

Some embodiments may receive a sequence of images or screenshots; conceal, in a first image or screenshot included in the sequence, sensitive information in a first part or element of a region or window; and conceal, in a second image or screenshots included in the sequence, sensitive information in a second part or element of the region. For example, MU 220 may conceal a name in box 325 in a first screenshot (but leave box 345 untouched, e.g., since no credit number was entered therein) and then mask box 345 in a second, subsequent screenshot, e.g., after a credit card number was entered. Rules in an application model 251 may be related or relevant to a number of elements. For example, a rule may dictate that if a valid credit card number is present in box 345 then the name of a customer in box 325 must also be masked, however, if no valid card number is identified in box 345 then the name of the customer may be left exposed, unmasked. In another example, an agent application 225 may present different elements over time inside the same window, MU 220 may detect elements as described as they appear over a sequence of screenshots and may mask elements as, if or when, they appear in a window.

In some embodiments, identifying a part or element in or of a region or window may be based on a distance of the part or element from a border of the region or window. For example, MU 220 may identify, and determine a location of, box 345 based on, or using distances 360 and 365 as described.

As described, some embodiments may provide a screen recording in which sensitive information is concealed. For example, recorded screens 241 may be or may include screenshots in which sensitive information such as a credit card number is concealed, e.g., as illustrated by screenshot 430.

Embodiments of the invention improve the technological field of data or computer screen recording as well as privacy and security of computer information. By automatically and efficiently selecting whether or not to conceal selected parts of a screenshot before it is recorded, embodiments of the invention enable continuous recording, e.g., of agents or employees screens while they work, while concealing sensitive information. Using a novel and efficient way to identify portions of a screenshot that should be concealed, embodiments of the invention increase speed of operation (e.g., reduce the time spent on locating sensitive information in a screenshot). Accordingly, embodiments of the invention enable removing or concealing sensitive information in real-time as described.

The term "real-time" (also known referred to in the art as "realtime", or "real time") as referred to herein generally relates to processing or handling of events at the rate or pace that the events occur or received (possibly defined by human perception). For example, a system according to embodiments of the invention may mask sensitive information in real-time, e.g., within milliseconds or other very brief periods so that masking of sensitive information in screenshots is done or achieved virtually immediately upon receiving the screenshots. For example, MU 220 may mask information in screenshots at the rate that the screenshots are received from SCU 215 such that a minimal delay is introduced. Although real-time mode is described, it will be understood that other modes of operation or configurations can be contemplated. For example, MU 220 may be provided with a stream or sequence of screenshots, images or frames from a database in storage system 240, may produced a modified sequence of frames by masking information in the frames screenshots as described and cause RU 230 to store the sequence of modified frames. Accordingly, embodiments may be used for removing or concealing information in recorded sessions that include sensitive information as well as for online, real-time removal of sensitive information as described.

Moreover, by selectively concealing or removing sensitive information, embodiments of the invention improve the field of computer data or screen recording by recording all non-sensitive information thus producing recorded sessions that include more information than that included in recorded sessions produced by current or known systems which may remove entire screenshots from a recording in order to avoid recording sensitive information, e.g., by stopping or halting a recording when sensitive information is suspected to be present on a screen.

Yet another improvement or advantage enabled or provided by some embodiments relates to grouping and OCR. As described, some embodiments may group regions and elements in a screenshot, identify groups and use the groups to selectively apply OCR to selected portions of selected groups. For example, having identified window 500 as a group (that is, grouping window 500 and its elements), an embodiment may further identify box 550 and, rather than applying OCR to the entire (whole of) screenshot 520, an embodiment may apply OCR only to box 550 (e.g., in the case that box 550 is the only one marked as sensitive in the corresponding or relevant application model 251). Accordingly, as oppose to known systems and methods which apply OCR to entire screenshots, embodiments of the invention greatly improve the field of recording, image processing and privacy by reducing processing time and use of computing resources.

In the description and claims of the present application, each of the verbs, "comprise" "include" and "have", and conjugates thereof, are used to indicate that the object or objects of the verb are not necessarily a complete listing of components, elements or parts of the subject or subjects of the verb. Unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of an embodiment as described. In addition, the word "or" is considered to be the inclusive "or" rather than the exclusive or, and indicates at least one of, or any combination of items it conjoins.

Descriptions of embodiments of the invention in the present application are provided by way of example and are not intended to limit the scope of the invention. The described embodiments comprise different features, not all of which are required in all embodiments. Some embodiments utilize only some of the features or possible combinations of the features. Variations of embodiments of the invention that are described, and embodiments comprising different combinations of features noted in the described embodiments, will occur to a person having ordinary skill in the art. The scope of the invention is limited only by the claims.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of preventing sensitive information from being recorded, the method comprising, by a computer processor:
during a training phase
receiving an image of a region of a computer monitor screen, the region including information presented by an application;
generating an application model that identifies the application by automatically determining a position or location of at least one part of the region relative to the computer monitor screen;
determining whether or not the at least one part of the region includes sensitive information by running optical character recognition of the at least one part of the region to detect a relevant string name;
identify an area box within the region near the detected relevant string name based on grouping a set of pixels;
determining relevant distances from at least one or more of edge of the area box to one or more edges of the region; and
including the area box and the relative distances within the application model;
at runtime
receiving a new image;
using the application model including the relative distances to locate the area box and determine if the area box includes sensitive information, then:
automatically concealing the sensitive information in the image based on the application model by changing a value of each of a set of pixels in the area box to a predefined value common to each of the set of pixels to thus generate a modified image; and
providing the modified image to a recorder.

2. The method of claim 1, comprising identifying a location of the at least one part of the region based on a relative location of the area box in the at least one part of the region.

3. The method of claim 2, comprising recalculating the location of the box in the at least one part of the region upon detecting a change of dimensions of the region.

4. The method of claim 1, wherein identifying the at least one part of the region is based on a respective position or location of a title.

5. The method of claim 1, wherein determining the at least one part of the region contains sensitive information is based on an interaction of a user with the application.

6. The method of claim 1, comprising, selectively concealing sensitive information in at least one of a plurality of parts of the region.

7. The method of claim 1, comprising:
receiving a sequence of images of the region;
concealing, in a first image included in the sequence, sensitive information in a first part of the region; and
concealing, in a second image included in the sequence, sensitive information in a second part of the region.

8. The method of claim 1, comprising providing a screen recording in which sensitive information is concealed.

9. A method of concealing sensitive information in a screenshot, the method comprising, using a computer processor:
in a training phase:
receiving a screenshot of a monitor from an application;
generating an application model that identifies the application by automatically determining a respective position or location of a part within the screenshot;
determining whether at least one part of the screenshot includes sensitive information by running optical character recognition of the at least one part of the screenshot to detect a relevant string;
identify an area box within the screenshot near the detected relevant string name based on grouping a set of pixels; and determining relevant distances from at least one or more of edge of the area box to one or more edges of the region; and including the area box and the relative distances within the application model;

at runtime:
receiving a new screenshot;
using the application model including the relative distances to locate the area box and determine if the area box includes sensitive information, then
automatically concealing the sensitive information in the screenshot based on the application model by changing a value of each of a set of pixels in the area box to a predefined value common to each of the set of pixels to thus generate a modified screenshot; and
storing the modified screenshot.

10. A system comprising:
a memory; and
a controller configured to:
during a training phase
receiving an image of a region of a computer monitor screen, the region including information presented by an application;
generating an application model that identifies the application by automatically determining a position or location of at least one part of the region relative to the computer monitor screen;
determining whether or not the at least one part of the region includes sensitive information by running optical character recognition of the at least one part of the region to detect a relevant string name;
identify an area box within the region near the detected relevant string name based on grouping a set of pixels;
determining relevant distances from at least one or more of edge of the area box to one or more edges of the region; and
including the area box and the relative distances within the application model;
at runtime
receiving a new image;
using the application model including the relative distances to locate the area box and determine if the area box includes sensitive information, then:
automatically concealing the sensitive information in the image based on the application model by changing a value of each of a set of pixels in the area box to a predefined value common to each of the set of pixels to thus generate a modified image; and
providing the modified image to a recorder.

11. The system of claim 10, wherein the controller is further configured to identify the location of the at least one part of the region based on the relative location of the at least one part of the region.

12. The system of claim 11, wherein the controller is further configured to recalculate the location of the at least one part of the region upon detecting a change of dimensions of the region.

13. The system of claim 10, wherein the controller is further configured to identify the at least one part of the region based on a title.

14. The system of claim 10, wherein the controller is further configured to determine the at least one part of the region contains sensitive information based on identifying presence of information in the at least one part.

15. The system of claim 6, wherein the controller is further configured to determine the at least one part of the region contains sensitive information based on an interaction of a user with the application.

* * * * *